United States Patent [19]
Murata et al.

[11] Patent Number: 5,826,683
[45] Date of Patent: Oct. 27, 1998

[54] MAGNETOSTRICTIVE BRAKE

[75] Inventors: Yukio Murata, Saitama; Hajime Yamada, 1709-5, Wakasato, Nagano-shi, Nagano, both of Japan

[73] Assignees: Akebono Brake Industry Co., Ltd., Tokyo; Akebono Research and Development Centre Ltd., Hanyu; Hajime Yamada, Nagano, all of Japan

[21] Appl. No.: 789,267

[22] Filed: Jan. 28, 1997

[30] Foreign Application Priority Data

Jan. 29, 1996 [JP] Japan .................................. 8-012983
Apr. 24, 1996 [JP] Japan .................................. 8-102774

[51] Int. Cl.$^6$ .............................. B60L 7/00; F16D 55/08
[52] U.S. Cl. ................................. 188/161; 188/72.1
[58] Field of Search ..................... 188/72.1, 72.4, 188/156, 158, 161, 164, 20; 303/115.2; 192/107 C, 107 T; 310/328; 60/545

[56] References Cited

U.S. PATENT DOCUMENTS

| | | | |
|---|---|---|---|
| 4,629,039 | 12/1986 | Imoto et al. | 188/158 |
| 4,705,323 | 11/1987 | Imoto et al. | 188/72.1 |
| 4,765,140 | 8/1988 | Imoto et al. | 60/545 |
| 5,000,295 | 3/1991 | Fargier | 188/72.1 |
| 5,645,143 | 7/1997 | Mohr et al. | 303/115.2 |

FOREIGN PATENT DOCUMENTS

| | | |
|---|---|---|
| 60-136629 | 7/1985 | Japan . |
| 61-167785 | 7/1986 | Japan . |
| 159819 | 7/1987 | Japan . |
| 64-21229 | 1/1989 | Japan . |
| 0361728 | 3/1991 | Japan . |

*Primary Examiner*—Robert J. Oberleitner
*Assistant Examiner*—Chris Schwartz
*Attorney, Agent, or Firm*—Morgan, Lewis & Bockius LLP

[57] ABSTRACT

A magnetostrictive brake is provided with an electrically-driven actuator for moving friction materials back and forth toward a rotary member by utilizing a magnetostrictive element which extends and contracts by means of magnetostriction, a fluid-type displacement enlarging mechanism which is provided between the magnetostrictive element and the friction materials and used for enlarging the displacement of the magnetostrictive element and transmitting the enlarged displacement to the friction materials, and bias magnetic field applying means for applying a bias magnetic field to the magnetostrictive element.

14 Claims, 4 Drawing Sheets

MAGNETOSTRICTIVE BRAKE

BACKGROUND OF THE INVENTION

1. Field of the Invention

The present invention relates to an electrically-driven magnetostrictive brake for use in braking a vehicle and more particularly to a magnetostrictive brake which utilizes a magnetostrictive or giant-magnetostrictive element for an electrically-driven actuator for moving friction materials back and forth.

2. Description of the Prior Art

The conventional hydraulic brake for use in vehicles with oil pressure as a driving source tend to become complicated in construction because the number of parts constituting hydraulic piping equipment and a hydraulic regulating mechanism is on the increase.

Although the recent tendency is for intelligent braking functions to be increasingly furnished by installing an antilock braking system, a traction control system and the like, it is needed to add to such a conventional hydraulic brake an electric-hydraulic control circuit for converting a predetermined electric signal into the mechanical operation of a hydraulic actuator in response to the locked or slipping condition of a wheel. For this reason, the control system becomes complicated or fine brake control becomes difficult under the influence of the servo effect featuring the mechanism above and this problem makes it hardly possible to render the braking system to be intelligent.

With the background mentioned above, there have recently been proposed an electrically-driven brake (U.S. Pat. No. 5,000,295) for generating predetermined braking force by pressing friction materials against a rotary braking member via a rotary-linear conversion mechanism or a reduction mechanism using a rotary motor as a driving source, and an electrically-driven brake (U.S. Pat. No. 4,765,140) using a piezoelectric ceramic material as a driving source.

In the aforementioned electrically-driven brake using a rotary motor or a piezoelectric ceramic material as a driving source, intelligent braking functions resulting from the installation of an antilock braking system and a traction control system can readily be provided.

However, a problem arising from the brake utilizing the rotary-motor as a driving source is that the apparatus tends to become large-sized because of the provision of the rotary-linear conversion or reduction mechanism.

In the case of the brake utilizing the piezoelectric ceramic material as a driving source, on the other hand, it is possible to reduce the size of the brake because the linear movement required for the friction materials to be moved back and forth is directly obtainable from the driving source without using the rotary-linear conversion or reduction mechanism; nevertheless, the problem in this case is that since the displacement of the piezoelectric ceramic material is small, the capacity of allowing for the wear of the friction materials is low.

Moreover, the necessity of an apparatus for generating a high voltage lowers the loading capacity of a vehicle.

SUMMARY OF THE INVENTION

An object of the present invention made in view of the foregoing problems is to provide a magnetostrictive brake capable of readily accomplishing intelligent braking functions resulting from the installation of an antilock braking system and a traction control system, which magnetostrictive brake is suitable for size reduction, capable of providing a greater displacement for friction materials to be moved back and forth and of increasing the allowable wear capacity of the friction materials, and excellent in not only reducing power consumption but also increasing response speed.

According to the present invention, there is provided a magnetostrictive brake comprising: an electrically-driven actuator for moving friction materials back and forth toward a rotary member so as to obtain braking force by pressing the friction materials against the rotary member, the actuator including a magnetostrictive element whose length varies with magnetostriction when a magnetic field is applied thereto so as to obtain the braking force of pressing the friction materials and an electromagnetic coil for applying the magnetic field to the magnetostrictive element in proportion to an input voltage; a control unit for controlling the voltage that is input to the electromagnetic coil in accordance with an operation of a brake operating part so as to control an operation of the actuator; and a fluid-type displacement enlarging mechanism installed between the magnetostrictive element and friction materials and enlarging a displacement of the magnetostrictive element and transmitting the enlarged displacement to the friction materials.

In the aforementioned magnetostrictive brake, the magnetostrictive element may be in a form of a rod, a length of the magnetostrictive element being varied along a direction in which the friction materials are moved back and forth when the magnetic field is applied thereto. And the displacement enlarging mechanism may comprise: a cylinder enclosing a fluid; a large-diameter piston which is passed through a wall portion on one side of the cylinder and coupled to one end of the magnetostrictive element and used to transmit the displacement of the magnetostrictive element to the fluid in the cylinder; and a small-diameter piston which is passed through a wall portion on the other side of the cylinder and coupled to the friction materials and used to transmit the displacement that was transmitted from the large-diameter piston to the fluid, to the friction materials; whereby a magnification of the displacement of the magnetostrictive element is set by an area ratio between the large-diameter piston and the small-diameter piston.

Further, according to the present invention, there is provided a magnetostrictive brake comprising: an electrically-driven actuator for moving friction materials back and forth toward a rotary member so as to obtain braking force by pressing the friction materials against the rotary member, the actuator including a magnetostrictive element whose length varies with magnetostriction when a magnetic field is applied thereto so as to obtain the braking force of pressing the friction materials and an electromagnetic coil for applying the magnetic field to the magnetostrictive element in proportion to an input voltage; a control unit for controlling the voltage that is input to the electromagnetic coil in accordance with an operation of a brake operating part so as to control an operation of the actuator; and bias magnetic field applying means for applying a bias magnetic field to the magnetostrictive element during a non-operation of the brake.

In the aforementioned magnetostrictive brake, the bias magnetic field applying means may include a permanent magnet installed around the magnetostrictive element and a magnetic material disposed adjacent to the permanent magnet. Or the bias magnetic field applying means has only the permanent magnet installed around the magnetostrictive element.

Further, the prestress applying means for applying a predetermined prestress to the magnetostrictive element may be provided.

With the arrangement above according to the present invention, the magnetostrictive element which extends and contracts by means of magnetostriction is used as a driving source for moving the friction materials back and forth toward the rotary body for braking purposes. By extending and contracting the rod-like magnetostrictive element in the direction in which the friction materials are moved back and forth by applying the magnetic field thereto, for example, it is possible to obtain the linear movement necessary for the friction materials to be moved back and forth along the backward-forward movements of the friction materials directly from the magnetostrictive element as a driving source.

Since the extension and contraction of the magnetostrictive element are controlled by the voltage applied to the electromagnetic coil surrounding the outer periphery of the magnetostrictive element, the braking operation can directly be controlled electrically.

Further, the amount of extension and contraction of the magnetostrictive element can readily be increased by intensifying an electric field to be applied to the magnetostrictive element, that is, by raising a voltage to be applied to the electromagnetic coil. In comparison with the case of a piezoelectric ceramic material, a displacement for moving the friction materials back and forth can be set greater, so that the power consumption is kept low.

Since the displacement of the magnetostrictive element is enlarged by the displacement enlarging mechanism before being transmitted to the friction materials, a displacement for moving the friction materials back and forth can be set greater than the displacement of the magnetostrictive element.

If the magnetostrictive element is made of a magnetostrictive material with a very large magnetic strain quantity, it is called a "giant-magnetostrictive element." When the giant-magnetostrictive element is kept in such a state that a predetermined quantity of initial strain has been applied thereto by applying the bias magnetic field to the giant-magnetostrictive element during the non-operation of the brake, the quantity of strain generated by the giant-magnetostrictive element with respect to variation in the intensity of the magnetic field applied by the electromagnetic coil during the operation of the brake can be made greater and not only the response property of the giant-magnetostrictive element with respect to variation in the intensity of the magnetic field but also the response property necessary for obtaining a predetermined displacement on the part of the actuator can also be improved. When, further, the giant-magnetostrictive element is kept in such a state that a predetermined quantity of initial strain has been applied thereto by applying the bias magnetic field to the giant-magnetostrictive element during the non-operation of the brake, the consumption of electric power required to obtain a predetermined quantity of initial strain of the giant-magnetostrictive element during the operation of the brake becomes reducible. The strain quantity generated by the giant-magnetostrictive element can further be increased by applying a predetermined prestress to the giant-magnetostrictive element.

DETAILED DESCRIPTION OF THE PREFERRED EMBODIMENTS

A detailed description will subsequently be given of the preferred embodiments of the present invention in the form of a magnetostrictive brake.

Figure 1:
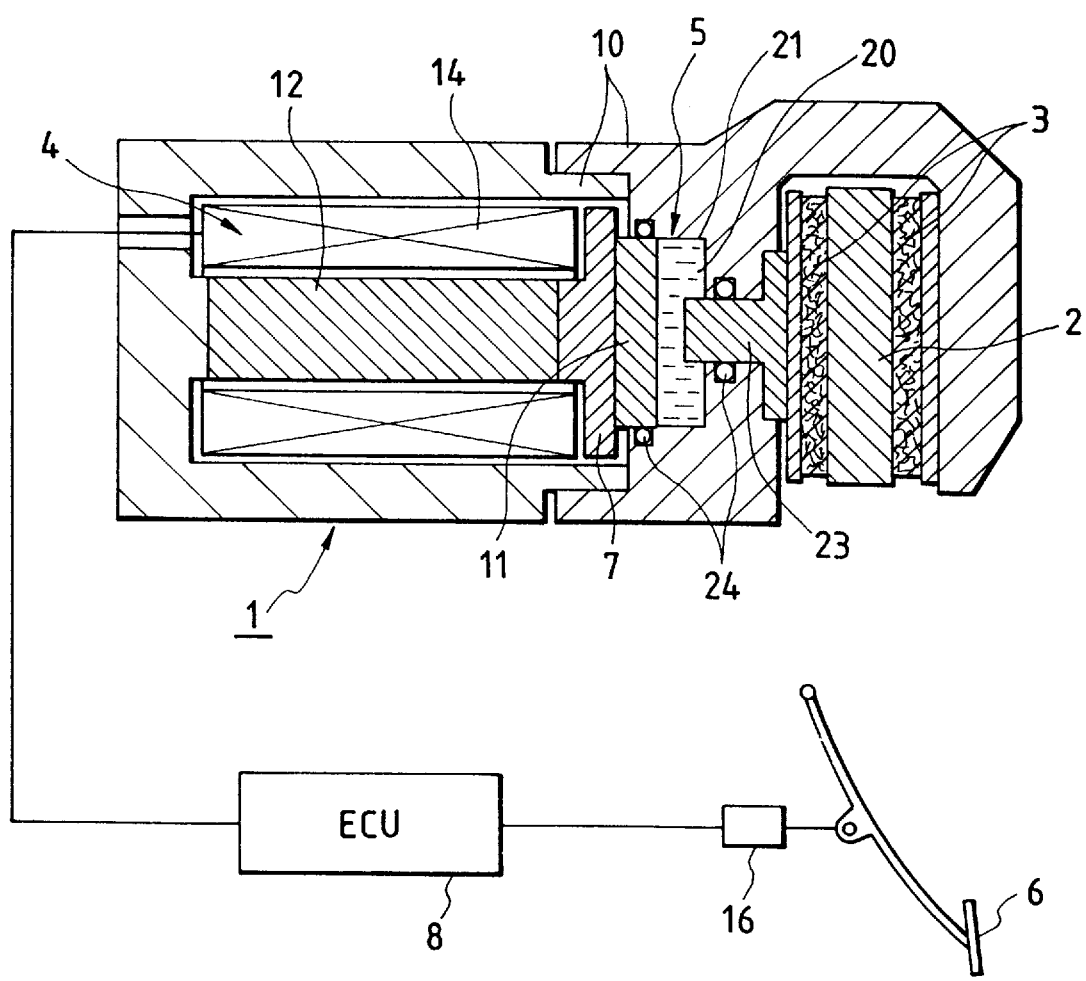
FIG. 1 is a sectional view of the principal part of a magnetostrictive brake as a first embodiment the invention.

FIG. 1 is a sectional view of the principal part of a magnetostrictive brake as a first embodiment according to the present invention.

This magnetostrictive brake 1 is provided as a vehicular disc brake and comprises a brake disc (rotor) 2 as a braking rotor, pads 3 as friction materials for generating braking force when pressed against the brake disc 2, an electrically-driven actuator 4 for moving the pads 3 back and forth toward the brake disc 2, a fluid-type displacement enlarging mechanism 5 for enlarging the displacement generated by the actuator 4 and transmitting the displacement to the pads 3, and a control unit (ECU) 8 for controlling the operation of the actuator 4 in response to the operation of a brake pedal 6 as a brake operating part.

A pair of pads 3 are provided for holding the brake disc 2 therebetween and supported by brake calipers 10 as friction-material supporting member so that the pads 3 are movable back and forth toward to the brake disc 2. The brake calipers 10 are known floating calipers in construction and slidably fixed to the friction-material supporting member via a pair of slide pins (not shown) and when the actuator 4 is driven, the pad 3 on the left-hand side of FIG. 1 presses the left side of the brake disc 2, whereas the pad 3 fitted to a caliper pawl portion 10a on the right-hand side of FIG. 1 presses the right side of the brake disc 2 because of reaction against the pressure applied from the left side.

The actuator 4 comprises a magnetostrictive element 12 and a substantially cylindrical electromagnetic coil 14. The magnetostrictive element 12 is in the form of a rod with one end (the left end of FIG. 1) retained by the brake caliper 10 and with the other end coupled to (actually in contact with only) a large-diameter piston 11 which forms the displacement enlarging mechanism 5 via a yoke 7 and an axial length thereof varies when a magnetic field is applied thereto. The electromagnetic coil 14 is fixed in the brake caliper 10 in such a way as to surround the outer periphery of the magnetostrictive element 12 and applies the magnetic field to the magnetostrictive element 12 in proportion to an input voltage.

When the brake pedal 6 is depressed by the driver, the control unit (ECU) 8 receives a stroke resulting from the depression of the brake pedal 6 or is informed of the depressing force applied via a known sensor 16.

The fluid-type displacement enlarging mechanism 5 is provided with a cylinder 21 which is formed on the brake caliper 10 and used to enclose a fluid 20, the large-diameter piston 11 which is passed through one wall of the cylinder 21 and coupled to the other end of the magnetostrictive element 12 so as to transmit the displacement of the magnetostrictive element 12 to the fluid 20 within the cylinder 21, and a small-diameter piston 23 which is passed through the other wall portion of the cylinder 21, coupled to the pads 3 and used to transmit the displacement transmitted from the large-diameter piston 11 to the fluid 20 to the pads 3. The fluid-type displacement enlarging mechanism 5 is also arranged so that the magnifying ratio of the displacement may be set to a desired value by properly designing the area ratio between the large-diameter piston 11 and the small-diameter piston 23 which are for use in applying pressure to the fluid 20 in the cylinder 21.

Brake oil, for example, may be used as the fluid 20 to be enclosed in the cylinder 21 as an incompressible heat-resistant fluid.

In addition, sealing members 24 for preventing the leakage of the fluid 20 are provided for the respective sliding portions of the pistons 11, 23 in the cylinder 21.

The control unit (ECU) 8 receives the sign 1 from the sensor 16 and detects the braking instruction of the driver so as to control the operation of the actuator 4, that is, to control the input voltage of the electromagnetic coil 14 in accordance with the signal from the sensor 16.

In other words, the magnetostrictive brake 1 employs the magnetostrictive element 12 which extends and contracts by means of magnetostriction as a driving source for moving the pads 3 back and forth toward the brake disc 2. As long as the magnetostrictive brake 1 is arranged so that it may extend and contract the rod-like magnetostrictive element 12 in the direction in which the pads 3 are moved back and forth by applying the magnetic field thereto, the linear movement necessary for the pads 3 are moved back and forth is directly obtainable from the magnetostrictive element 12 as a driving source. Thus the magnetostrictive brake can be made compact without using the rotary-linear conversion or reduction mechanism.

The extension and contraction of the magnetostrictive element 12 are controlled by means of the voltage applied through the electromagnetic coil 14 which surrounds the outer periphery of the magnetostrictive element 12. Since the magnetostrictive element 12 can be controlled electrically and directly, it is easy to provide intelligent braking functions resulting from the installation of an antilock braking system and that of a traction control system.

Further, the amount of extension and contraction of the magnetostrictive element 12 can readily be increased by intensifying an electric field to be applied to the magnetostrictive element 12, that is, by raising a voltage to be applied to the electromagnetic coil 14. In comparison with the case of a piezoelectric ceramic material, a displacement (stroke) for moving the pads 3 back and forth can be set greater and the pads 3 can be driven at low voltages, so that the power consumption is kept low.

Since the displacement of the magnetostrictive element 12 is enlarged by the displacement enlarging mechanism 5 before being transmitted to the pads 3, a displacement for moving the pads 3 back and forth can be set greater than the displacement of the magnetostrictive element 12. Therefore, the displacement required for the pads 3 is made attainable with a smaller magnetostrictive element 12 or the allowable wear capacity of the friction materials is made improvable by setting greater a displaceable range of the pads 3.

Although various heretofore-known displacement enlarging mechanisms are utilizable as those for enlarging the displacement of the magnetostrictive element 12 and transmitting the enlarged displacement to the pads 3, the application of the fluid-type displacement enlarging mechanism 5 for setting a magnification of the displacement from the area ratio between the large-diameter piston 11 and the small-diameter piston 23 which are for use in applying pressure to the fluid 20 makes it possible, as is obvious from FIG. 1 according to this embodiment of the invention, to obtain desired performance with not only a smaller number of parts but also a simple construction.

The setting of the area ratio between the large-diameter piston 11 and the small-diameter piston 23 at 10 : 1, for example, according to this embodiment of the invention, will produce a ten-times greater displacement force of the magnetostrictive element 12 to be transmitted to the pads 3. With the use of a magnetostrictive element whose displacement is 1,000 PPM and whose shaft length is 10 cm as such a magnetostrictive element 12, the stroke of the pads 3 can be reduced up to 1 mm, which is sufficient in value for the stroke of the pads 3.

Although the rod-like magnetostrictive element 12 has been used to generate magnetostriction lengthwise according to the above-described embodiment of the invention, use may also be made of a magnetostrictive element for diametrically generating magnetostriction. When such a magnetostrictive element for diametrically generating magnetostriction is employed, however, the fluid-type displacement enlarging mechanism needs improving, so that the piston members coupled to the pads 3 are displaced by the fluid pressurized by the diametric displacement of the magnetostrictive element.

Further, the magnetostrictive brake according to the present invention is not limited to the disc brake according to the above-described embodiment of the invention but may be applicable to a drum brake.

Figure 2:
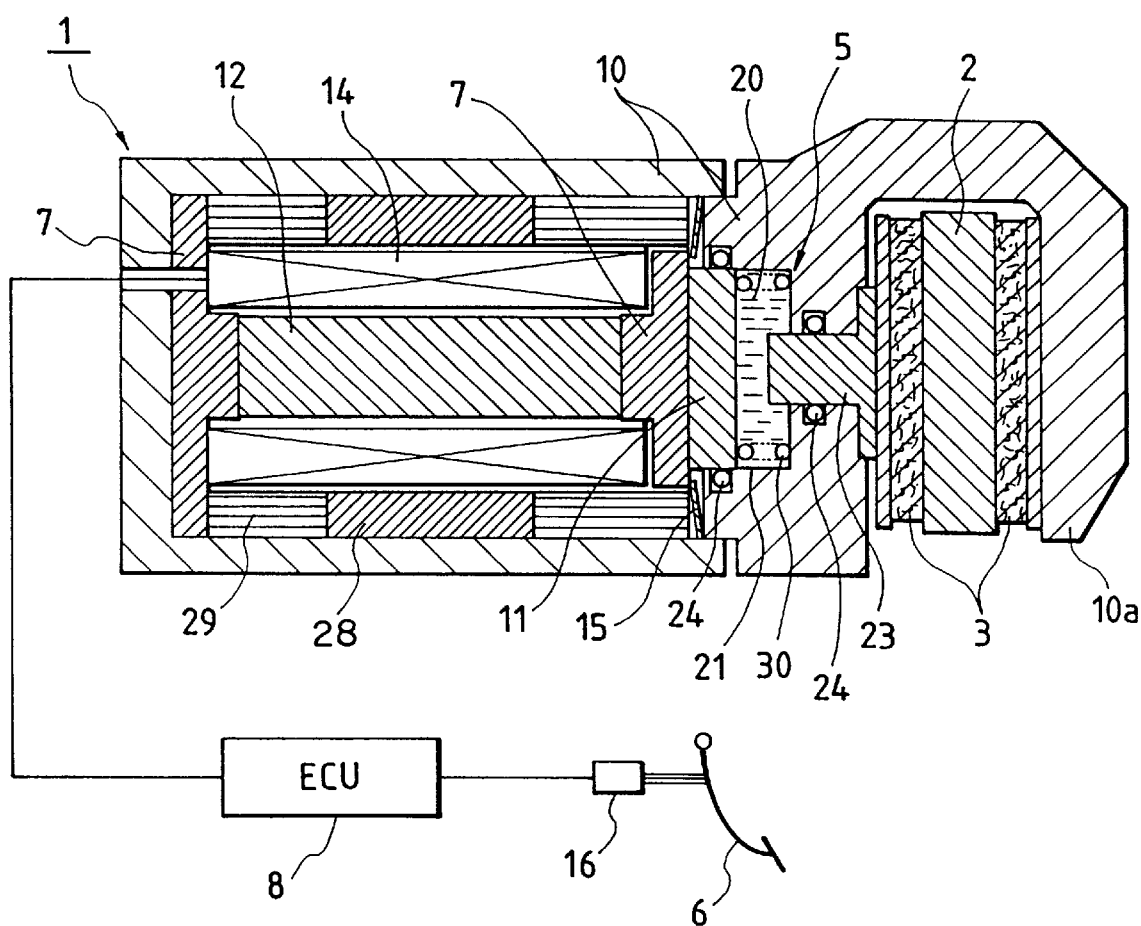
FIG. 2 is a sectional view of the principal part of a magnetostrictive brake as a second embodiment of the invention.

FIG. 2 is a sectional view of the principal part of a magnetostrictive brake as a second embodiment of the invention. This magnetostrictive brake has the substantially same constitution as the magnetostrictive brake according to the aforementioned first embodiment. In the second embodiment, a giant-magnetostrictive element 12 is used instead of the magnetostrictive element 12 in the first embodiment. And a spring 15 is held between the yoke 7 and the brake calipers 10 and used to increase the strain quantity of the giant-magnetostrictive element 12 while it is energized by urging the giant-magnetostrictive element 12 in the direction of compression. Further, a large-diameter piston return spring 30 is provided for urging the large-diameter piston 11 toward the yoke 7.

In the second embodiment of the invention, a bias magnetic field applying means for applying a bias magnetic field to the giant-magnetostrictive element 12 during the non-operation of the brake which is the period when braking operation is released, is such that a cylindrical permanent magnet 28 and a magnetic material 29 are arranged in such a way as to surround the outer periphery of the electromagnetic coil 14. The permanent magnet 28 together with the magnetic material 29 is used to apply a bias magnetic field $H_B$ to the giant-magnetostrictive element 12.

When a load (hereinafter referred to as prestress) is applied to the giant-magnetostrictive element beforehand, the strain quantity of the giant-magnetostrictive element, that is, a displacement so to speak generated in the same magnetic field is generally known to be greater. Therefore, the spring 15 for urging the giant-magnetostrictive element 12 in the direction of compression is installed between the yoke 7 and the brake caliper 10 according to this embodiment of the invention.

Figure 3:
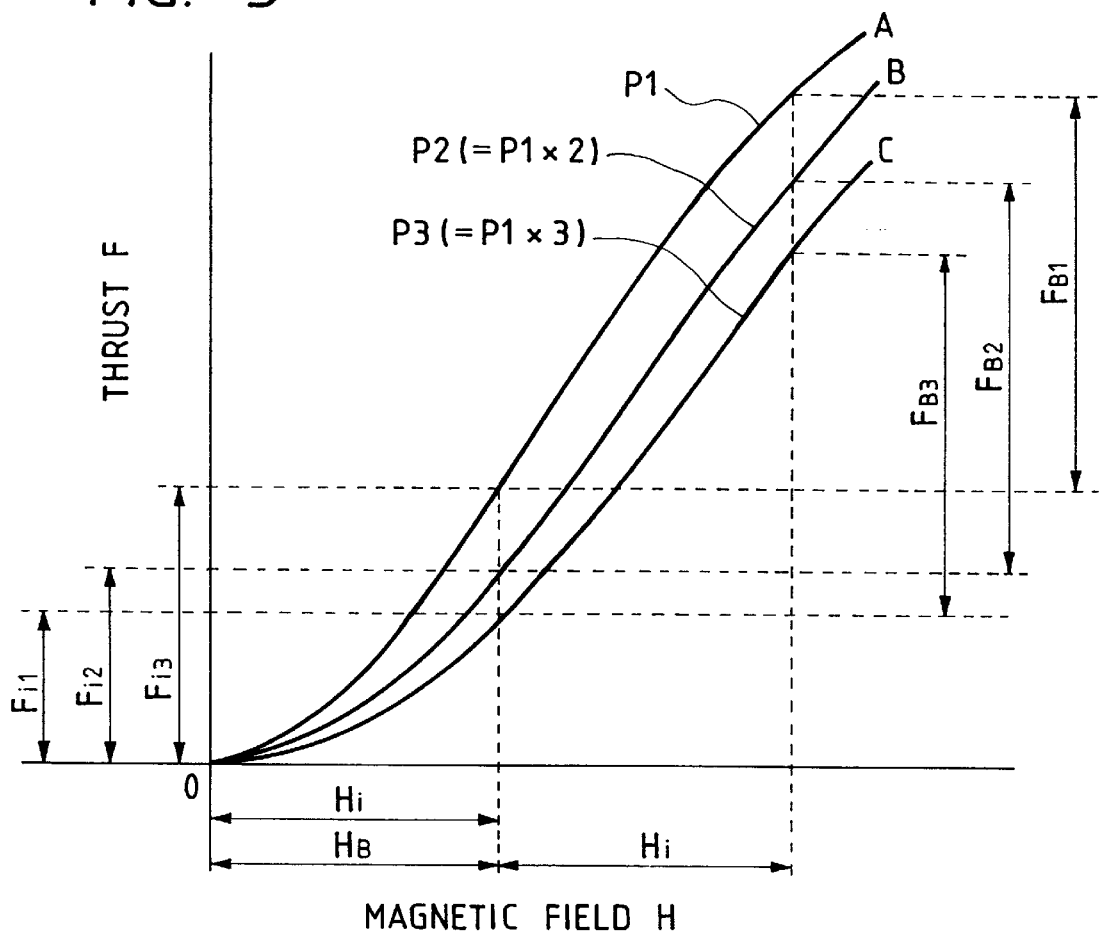
FIG. 3 is a graph illustrating the relation between intensity of the magnetic fields and thrust characteristics and strain quantity of giant-magnetostrictive elements with respect to prestress applied to the giant-magnetostrictive elements in a magnetostrictive brake according to the present invention.

Curves A, B, C in FIG. 3 show the relation between the intensity of magnetic fields and thrusts with respect to prestress P1, prestress P2 twice as great as P1 and prestress P3 three times as great as P1. When the prestress is applied to the giant-magnetostrictive element, the displacement generated in the same magnetic field is increased. As shown in FIG. 3, however, the thrust of the giant-magnetostrictive element generated in the same magnetic field is not necessarily said to be highly efficient.

In FIG. 3, $H_i$ represents the intensity of the magnetic field generated in the coil at a current value I; $H_B$, the intensity of the bias magnetic field; $F_{i1}$, thrust by $H_i$ without the bias magnetic field at the prestress P1; $F_{i2}$, thrust by $H_i$ without the bias magnetic field at the prestress P2; $F_{i3}$, thrust by $H_i$ without the bias magnetic field at the prestress P3; $F_{B1}$, thrust by $H_i$ with the bias magnetic field applied at the prestress P1; $F_{B2}$, thrust by $H_i$ with the bias magnetic field applied at the prestress P2; and $F_{B3}$, thrust by $H_i$ with the bias magnetic field applied at the prestress P3.

Figure 4:
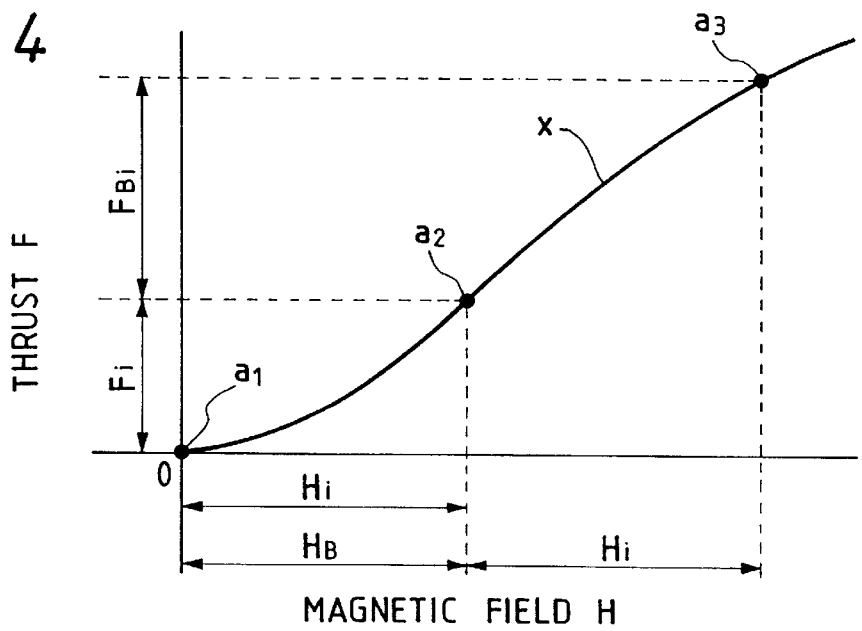
FIG. 4 is a graph illustrating the relation between, intensity of the magnetic fields and the quantity of thrust generated in the giant-magnetostrictive elements with respect to prestress applied to the giant-magnetostrictive elements in the magnetostrictive brake according to the present invention.

A curve X in FIG. 4 shows the relation between the intensity H of the magnetic field applied to the giant-magnetostrictive element 12 and the thrust generated by the intensity H of the magnetic field in the giant-magnetostrictive element 12.

The curve X has, as shown in FIG. 4, two inflection points $a_2$, $a_3$ and the thrust generated with respect to an increasing ratio of the intensity of the magnetic field shows a slightly inclined curve in the range of the intensity of the magnetic field below the inflection point $a_2$. The thrust generated with respect to an increasing ratio of the intensity of the magnetic field shows a sharply inclined curve in the range of the intensity of the magnetic field between the inflection points $a_2$ and $a_3$. Further, the thrust generated with respect to an increasing ratio of the intensity of the magnetic field again returns to a slightly inclined curve in the range of the intensity of the magnetic field above the inflection point $a_3$.

With the normal intensity of the magnetic field as the magnetic field $H_i$ applied during the operation of the brake, which intensity is generated by the electromagnetic coil 14 due to the current supplied thereto by the control unit 8 in response to the operation of the brake, and with the intensity of the magnetic field at the inflection point $a_2$ as the bias magnetic field $H_B$, the thrust action of the giant-magnetostrictive element 12 after the brake is actuated starts from the point $a_1$ on the curve X without the application of the bias magnetic field $H_B$, whereas with the application of the bias magnetic field $H_B$, the thrust action of the giant-magnetostrictive element 12 after the brake is actuated starts from the inflection point $a_2$. When the same intensity of the magnetic field is applied by the electromagnetic coil 14 in response to the operation of the brake,,the thrust obtainable with the application of the bias magnetic field $H_B$ is greater.

In FIG. 4, $H_i$ represents the intensity of the magnetic field generated in the coil at the current value I; $H_B$, the intensity of the bias magnetic field; $F_i$, thrust when the intensity of the magnetic field H is increased from 0 to $H_i$; and $F_{Bi}$, thrust when the intensity H of the magnetic field is increased from $H_B$ to $2H_i$.

As shown in FIGS. 3 and 4, the most efficient displacement and thrust characteristics are obtainable by properly selecting the intensity $H_B$ of the bias magnetic field and the prestress of the spring 15, for example, by substantially equalizing an increasing quantity of thrust F with the intensity H of the magnetic field above the intensity $H_B$ of the bias magnetic field, that is, making the thrust F substantially proportional to the intensity H of the magnetic field above the intensity $H_B$ of the bias magnetic field.

Figure 5:
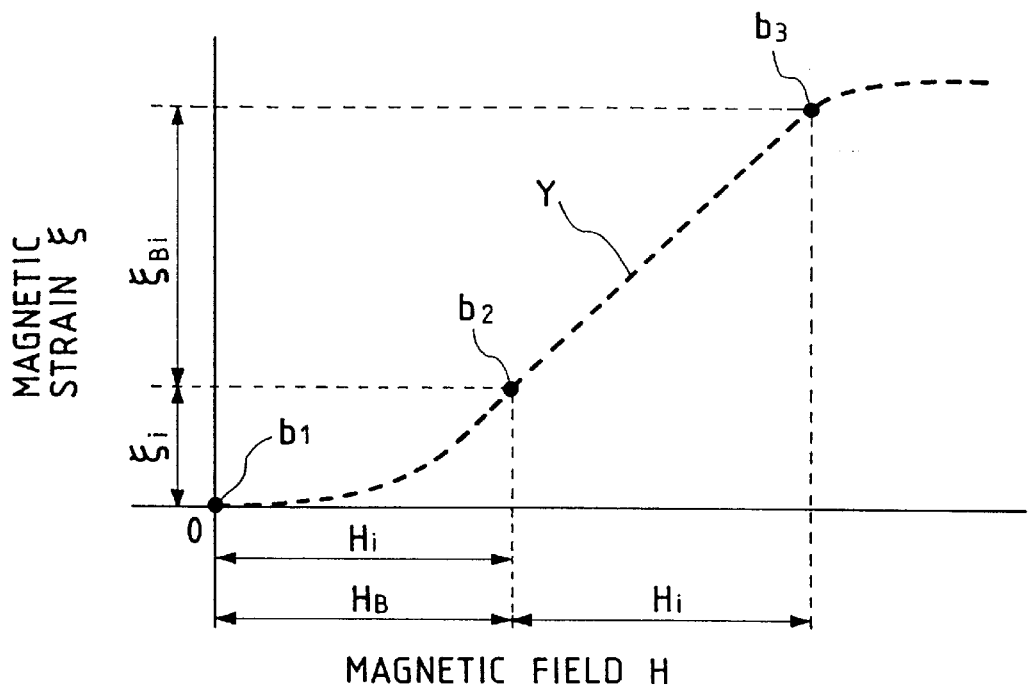
FIG. 5 is a graph illustrating the relation between intensity of the magnetic fields applied to giant-magnetostrictive elements and the quantity of strain generated in the giant-magnetostrictive elements in the magnetostrictive brake according to the present invention.

A curve Y in FIG. 5 shows the relation between the intensity H of the magnetic field applied by the giant-magnetostrictive element 12 and the magnetic strain $\xi$ generated in the giant-magnetostrictive element 12 because of the intensity H of the magnetic field.

The curve Y has, as shown in FIG. 5, two inflection points $b_2$, $b_3$ and the quantity of strain generated with respect to an increasing ratio of the intensity of the magnetic field shows a slightly inclined curve in the range of the intensity of the magnetic field below the inflection point $b_2$, thus indicating a low response speed. The quantity of strain generated with respect to an increasing ratio of the intensity of the magnetic field shows a sharply inclined curve in the range of the intensity of the magnetic field between the inflection points $b_2$ and $b_3$. Further, the quantity of strain generated with respect to an increasing ratio of the intensity of the magnetic field again returns to a slightly inclined curve in the range of the intensity of the magnetic field above the inflection point $b_3$.

With the normal intensity of the magnetic field as the magnetic field $H_i$ applied during the operation of the brake, which intensity is generated by the electromagnetic coil 14 due to the current supplied thereto by the control unit 8 in response to the operation of the brake, and with the intensity of the magnetic field at the inflection point $b_2$ as the bias magnetic field $H_B$, the strain action of the giant-magnetostrictive element 12 after the brake is actuated starts from the point $b_1$ on the curve Y without the application of the bias magnetic field $H_B$, whereas with the application of the bias magnetic field $H_B$, the strain action of the giant-magnetostrictive element 12 after the brake is actuated starts from the inflection point $b_2$. When the same intensity of the magnetic field is applied by the electromagnetic coil 14 in response to the operation of the brake, the quantity of strain obtainable with the application of the bias magnetic field $H_B$ is greater.

In FIG. 5, $H_i$ represents the intensity of the magnetic field generated in the coil at the current value I; $H_B$, the intensity of the bias magnetic field; $\xi_i$, magnetic strain when the intensity H of the magnetic field is increased from 0 to $H_i$; and $\xi_{Bi}$, magnetic strain when the intensity $H_i$ of the magnetic field is applied after the intensity $H_B$ of the bias magnetic field is applied.

The giant-magnetostrictive brake 1 employs the giant-magnetostrictive element 12 which extends and contracts by means of magnetostriction as a driving source for pressing the pads 3 against the brake disc 2. As long as the giant-magnetostrictive brake 1 is arranged so that it may extend the rod-like giant-magnetostrictive element 12 in the direction in which the pads 3 are moved by applying the magnetic field thereto, the linear movement necessary for the pads 3 are pressed is directly obtainable from the giant-magnetostrictive element 12 as a driving source. Thus the magnetostrictive brake can be made compact without using the rotary-linear conversion or reduction mechanism.

The extension of the giant-magnetostrictive element 12 is controlled by means of the voltage applied through the electromagnetic coil 14 which surrounds the outer periphery of the giant-magnetostrictive element 12. Since the giant-magnetostrictive element 12 can be controlled electrically and directly, it is easy to provide intelligent braking functions resulting from the installation of an antilock braking system and that of a traction control system.

Further, the amount of extension of the giant-magnetostrictive element 12 can readily be increased by intensifying an electric field to be applied to the giant-magnetostrictive element 12, that is, by raising a voltage to be applied to the electromagnetic coil 14 and together with the effect of reducing power consumption by applying the bias magnetic field $H_B$, power consumption becomes reducible further.

Since the displacement of the giant-magnetostrictive element 12 is enlarged by the displacement enlarging mechanism 5 before being transmitted to the pads 3, a displacement for use in pressing the pads 3 can be set greater than the displacement of the giant-magnetostrictive element 12. Moreover, the use of the displacement enlarging mechanism 5 prevents the giant-magnetostrictive element from being damaged because the giant-magnetostrictive element is made of extremely fragile material. When the force of pressing the pads 3 is obtained in the magnetostrictive brake 1, the deformation of the caliper pawl portion 10a is not parallel to the piston stroke and even if a deflection load is applied to the small-diameter piston 23, the deflection load applied to the small-diameter piston 23 will never transmitted to the giant-magnetostrictive element 29 as the fluid is held between the large-diameter piston 11 and the small-diameter piston 23 in the displacement enlarging mechanism 5 according to this embodiment of the invention. In the displacement enlarging mechanism 5 according to this embodiment of the invention, further, the large-diameter piston 11 is restricted by the sealing member 24 and this makes it unlikely to cause vertical stress (due to the pinching of the piston and the like) in the direction in which the giant-magnetostrictive element 29 is displaced.

Figure 6:
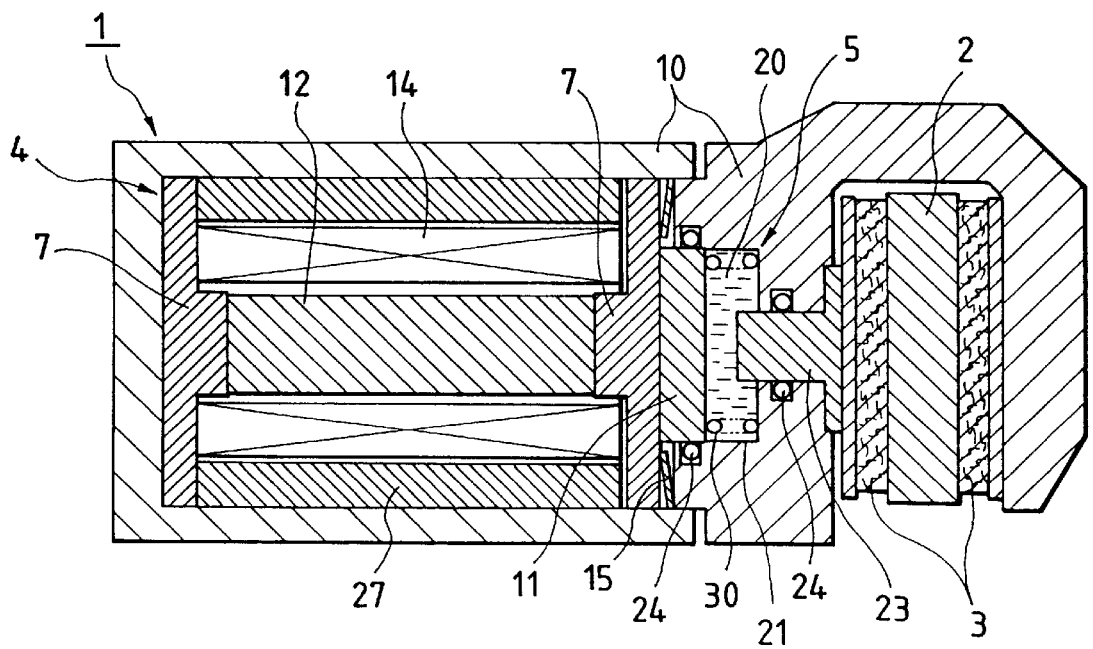
FIG. 6 is a sectional view of the principal part of a magnetostrictive brake as a third embodiment of the invention.

Although a description has been given of a case where the bias magnetic field $H_B$ is generated by supplying the predetermined current to the electromagnetic coil 14 during the non-operation of the brake in the first embodiment of the invention, the cylindrical permanent magnet 27 is installed in such a way as to surround the outer periphery of the electromagnetic coil 14 as shown in FIG. 6, for example, whereby the permanent magnet 27 is used to apply the bias magnetic field $H_B$ to the giant-magnetostrictive element 12.

As set forth above, the magnetostrictive brake according to the present invention can be made compact since the magnetostrictive element which extends and contracts by means of magnetostriction is used as a driving source for moving the friction materials back and forth toward the rotary member for braking purposes, the linear movement required for the friction materials to be moved back and forth is directly obtainable from the driving source without using the rotary-linear conversion or reduction mechanism.

Since the extension and contraction of the magnetostrictive element are electrically and directly controllable by the voltage applied to the electromagnetic coil surrounding the outer periphery of the magnetostrictive element, intelligent braking functions resulting from the installation of an antilock braking system and a traction control system are readily accomplished.

Further, the amount of extension and contraction of the magnetostrictive element can readily be increased by intensifying an electric field to be applied to the magnetostrictive element, that is, by raising a voltage to be applied to the electromagnetic coil. In comparison with the case of a piezoelectric ceramic material, a displacement for moving the friction materials back and forth can be set greater, so that the allowable wear capacity of the friction materials is increasable.

Since the displacement of the magnetostrictive element is enlarged by the fluid-type displacement enlarging mechanism before being transmitted to the friction materials, a displacement for moving the friction materials back and forth can be set greater than the displacement of the magnetostrictive element. Therefore, the displacement required for the friction materials is made attainable with a smaller magnetostrictive element or the allowable wear capacity of the friction materials is made improvable by setting greater a displaceable range of the friction materials.

When the giant-magnetostrictive element is kept in such a state that a predetermined quantity of initial strain has been applied thereto by applying the bias magnetic field to the giant-magnetostrictive element during the non-operation of the brake, the quantity of strain generated by the giant-magnetostrictive element with respect to variation in the intensity of the magnetic field applied by the electromagnetic coil during the operation of the brake can be made greater and not only the response property of the giant-magnetostrictive element with respect to variation in the intensity of the magnetic field but also the response property necessary for obtaining a predetermined displacement on the part of the actuator is improvable. The consumption of electric power required to obtain a predetermined displacement is also reducible.

Since the displacement of the giant-magnetostrictive element is enlarged by the displacement enlarging mechanism before being transmitted to the friction materials, a displacement for moving the friction materials can be set greater than the displacement of the giant-magnetostrictive element.

What is claimed is:

1. A magnetostrictive brake comprising:
   an electrically-driven actuator for moving friction materials back and forth toward a rotary member so as to obtain braking force by pressing said friction materials against said rotary member, said actuator including a magnetostrictive element whose length varies with magnetostriction when a magnetic field is applied thereto so as to obtain the braking force of pressing said friction materials and an electromagnetic coil for applying the magnetic field to said magnetostrictive element in proportion to an input voltage;
   a control unit for controlling the voltage that is input to said electromagnetic coil in accordance with an operation of a brake operating part so as to controll an operation of said actuator; and
   bias magnetic field applying means for applying a bias magnetic field to said magnetostrictive element during a non-operation of the brake.

2. The magnetostrictive brake according to claim 1, further comprising a fluid-type displacement enlarging mechanism installed between said magnetostrictive element and friction materials and enlarging a displacement of said magnetostrictive element and transmitting the enlarged displacement to said friction materials.

3. The magnetostrictive brake according to claim 2, wherein said magnetostrictive element is in a form of a rod, a length of said magnetostrictive element being varied along a direction in which said friction materials are moved back and forth when the magnetic field is applied thereto, and said displacement enlarging mechanism comprises: a cylinder enclosing a fluid; a large-diameter piston which is passed through a wall portion on one side of said cylinder and coupled to one end of said magnetostrictive element and used to transmit the displacement of said magnetostrictive element to said fluid in said cylinder; and a small-diameter piston which is passed through a wall portion on the other side of said cylinder and coupled to said friction materials and transmit to said friction materials, the displacement transmitted from said large-diameter piston to the fluid; whereby a magnification of the displacement of said magnetostrictive element is set by an area ratio between said large-diameter piston and said small-diameter piston.

4. The magnetostrictive brake according to claim 1, wherein said bias magnetic field applying means includes a permanent magnet installed around said magnetostrictive element and a magnetic material disposed adjacent to said permanent magnet.

5. The magnetostrictive brake according to claim 1, wherein said bias magnetic field applying means has a permanent magnet installed around said magnetostrictive element.

6. The magnetostrictive brake according to claim 1, further comprising prestress applying means for applying a predetermined prestress to said magnetostrictive element.

7. The magnetostrictive brake according to claim 1, wherein said magnetostrictive element is a giant-magnetostrictive element.

8. A magnetostrictive brake comprising:
an electrically-driven actuator for moving friction materials back and forth toward a rotary member so as to obtain braking force by pressing said friction materials against said rotary member, said actuator including a magnetostrictive element whose length varies with magnetostriction when a magnetic field is applied thereto so as to obtain the braking force of pressing said friction materials and an electromagnetic coil for applying the magnetic field to said magnetostrictive element in proportion to an input voltage;
a control unit for controlling the voltage that is input to said electromagnetic coil in accordance with an operation of a brake operating part so as to control an operation of said actuator;
a fluid-type displacement enlarging mechanism installed between said magnetostrictive element and friction materials and enlarging a displacement of said magnetostrictive element and transmitting the enlarged displacement to said friction materials, said fluid displacement enlarging mechanism comprising:
a cylinder enclosing a fluid;
a large-diameter piston which is engaged with one end of said magnetostrictive element and used to transmit the displacement of said magnetostrictive element to said fluid in said cylinder; and
a small-diameter piston which is engaged with said friction materials and transmit the displacement transmitted from said large-diameter piston to the fluid to said friction materials; and
bias magnetic field applying means for applying a bias magnetic field to said magnetostrictive element during a non-operation of the brake.

9. The magnetostrictive brake according to claim 8, wherein said bias magnetic field applying means includes a permanent magnet installed around said magnetostrictive element and a magnetic material disposed adjacent to said permanent magnet.

10. The magnetostrictive brake according to claim 8, wherein said bias magnetic field applying means has a permanent magnet installed around said magnetostrictive element.

11. The magnetostrictive brake according to claim 8, further comprising prestress applying means for applying a predetermined prestress to said magnetostrictive element.

12. A magnetostrictive brake comprising:
an electrically-driven actuator for moving friction materials back and forth toward a rotary member so as to obtain braking force by pressing said friction materials against said rotary member, said actuator including a magnetostrictive element whose length varies with magnetostriction when a magnetic field is applied thereto so as to obtain the braking force of pressing said friction materials and an electromagnetic coil for applying the magnetic field to said magnetostrictive element in proportion to an input voltage;
a control unit for controlling the voltage that is input to said electromagnetic coil in accordance with an operation of a brake operating part so as to control an operation of said actuator; and
a fluid displacement enlarging mechanism installed between said magnetostrictive element and friction materials and enlarging a displacement of said magnetostrictive element and transmitting the enlarged displacement to said friction materials;
said fluid displacement enlarging mechanism comprising:
a cylinder enclosing a fluid;
a large-diameter piston which is engaged with one end of said magnetostrictive element and used to transmit the displacement of said magnetostrictive element to said fluid in said cylinder; and
a small-diameter piston which is engaged with said friction materials and used to further transmit the displacement which has been transmitted from said large-diameter piston to the fluid in said cylinder to said friction materials.

13. The magnetostrictive brake according to claim 12, wherein said magnetostrictive element is a giant-magnetostrictive element.

14. A magnetostrictive brake comprising:
an electrically-driven actuator for moving friction materials back and forth toward a rotary member so as to obtain braking force by pressing said friction materials against said rotary member, said actuator including a magnetostrictive element whose length varies with magnetostriction when a magnetic field is applied thereto so as to obtain the braking force of pressing said friction materials and an electromagnetic coil for applying the magnetic field to said magnetostrictive element in proportion to an input voltage;
a control unit for controlling the voltage that is input to said electromagnetic coil in accordance with an operation of a brake operating part so as to control an operation of said actuator; and
a fluid displacement enlarging mechanism installed between said magnetostrictive element and friction materials and enlarging a displacement of said magnetostrictive element and transmitting the enlarged displacement to said friction materials;
said fluid displacement enlarging mechanism comprising:
a cylinder enclosing a fluid;
a large-diameter piston which is passed through a wall portion on one side of said cylinder can coupled to one end of said magnetostrictive element to said fluid in said cylinder and used to transmit the displacement of said magnetostrictive element to said fluid in said cylinder; and
a small-diameter piston which is passed through a wall portion on the other side of said cylinder and coupled to said friction materials and used to further transmit the displacement which has been transmitted from said large-diameter piston to the fluid in said cylinder to said friction materials; whereby a magnification of the displacement of said magnetostrictive element is set by an area ratio between said large-diameter piston and small-diameter piston;

wherein said magnetostrictive element is in the form of a rod, a length of said magnetostrictive element being varied along a direction in which said friction materials are moved back and forth when the magnetic field is applied thereto.

* * * * *